(12) United States Patent
Denenberg et al.

(10) Patent No.: US 8,738,648 B2
(45) Date of Patent: May 27, 2014

(54) SYSTEM AND METHOD FOR DELIVERY OF BUSINESS INFORMATION THROUGH AN ELECTRONIC ADDRESS BOOK

(75) Inventors: Jack Denenberg, Sammamish, WA (US); Ely Shemesh, Bend, OR (US); Stephen Chappell, Los Angeles, CA (US)

(73) Assignee: AT&T Mobility II LLC, Atlanta, GA (US)

( * ) Notice: Subject to any disclaimer, the term of this patent is extended or adjusted under 35 U.S.C. 154(b) by 455 days.

(21) Appl. No.: 12/825,224

(22) Filed: Jun. 28, 2010

(65) Prior Publication Data
US 2011/0320422 A1    Dec. 29, 2011

(51) Int. Cl.
*G06F 17/30* (2006.01)
(52) U.S. Cl.
CPC .................... *G06F 17/30997* (2013.01)
USPC ........... 707/770; 707/610; 707/621; 707/626; 707/634
(58) Field of Classification Search
None
See application file for complete search history.

(56) References Cited

U.S. PATENT DOCUMENTS

| | | | | |
|---|---|---|---|---|
| 5,832,510 A * | 11/1998 | Ito et al. | | 711/100 |
| 2001/0039546 A1* | 11/2001 | Moore et al. | | 707/10 |
| 2005/0138074 A1* | 6/2005 | O'Connor et al. | | 707/104.1 |
| 2006/0046768 A1* | 3/2006 | Kirbas | | 455/550.1 |
| 2007/0038720 A1* | 2/2007 | Reding et al. | | 709/217 |
| 2007/0143217 A1* | 6/2007 | Starr | | 705/51 |
| 2008/0125148 A1* | 5/2008 | Zhao et al. | | 455/466 |
| 2008/0162497 A1* | 7/2008 | Lim | | 707/10 |
| 2009/0182957 A1* | 7/2009 | Yashiro | | 711/156 |
| 2011/0113084 A1* | 5/2011 | Ramnani | | 709/201 |

* cited by examiner

*Primary Examiner* — Sangwoo Ahn
(74) *Attorney, Agent, or Firm* — Harman & Citrin LLC

(57) ABSTRACT

Systems and methods are provided to deliver business information to users through users' online address books. Data aggregation servers associate individual businesses with one or more unique identifiers. The data aggregation servers collect, store and periodically update business information relating to individual businesses from a variety of sources, such as the businesses themselves and third party sources, such as online publications and message boards. The data aggregation servers store the information in association with the unique identifier. Electronic address book applications hosted on user devices store address book entries for individual businesses in local address book databases. The entries for each business include the unique identifier, and the online address book applications use the unique identifier to retrieve business information relating to individual businesses from the data aggregation servers.

17 Claims, 4 Drawing Sheets

SYSTEM AND METHOD FOR DELIVERY OF BUSINESS INFORMATION THROUGH AN ELECTRONIC ADDRESS BOOK

FIELD OF THE TECHNOLOGY

At least some embodiments disclosed herein relate, in general, to systems that provide information relating to businesses to end users, and more particularly, to providing current business information using address book applications hosted on user devices or provided by application service providers.

BACKGROUND

Information on businesses changes frequently both in terms of the information the business wants to broadcast to attract potential customers and third party information that provides ratings, reviews and comments on the business. In the case of the business itself, the establishment may move to a different physical address, or change the telephone, email or web address that the business uses for customer interaction from time to time. On a more frequent basis the business may change its hours of operations, products and services carried, and provide special announcements or promotional messages including time sensitive specials or coupons. In the case of third party sources of information, the ratings from rating services and most recent customer or professional reviews may change every day.

Typically, unique business and advertising information is provided to users when a user looks up a business through, for example, a search service, and obtains, for example, promotional items, reviews or coupons. Oftentimes, however, the latest information is only available if the user explicitly looks up the information. Such information does not, however, persist on user devices such as, for example, an element of the customer's address book.

BRIEF DESCRIPTION OF THE DRAWINGS

The embodiments are illustrated by way of example and not limitation in the figures of the accompanying drawings in which like references indicate similar elements.

DETAILED DESCRIPTION

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described that may be exhibited by some embodiments and not by others. Similarly, various requirements are described which may be requirements for some embodiments but not other embodiments.

Various embodiments of the systems and methods provide the most current information on businesses to users' mobile and online address books by providing a feed from each business, as well as third party sources, to users who are current or potential customers of such businesses. In at least one embodiment, the contact information held in the customer's address book is expanded to include unique business fields including a field that stores a unique business identifier or key. The mobile and online address books use the identifier or key to request updates from a source of business and advertising information on an as-needed basis.

Figure 1:
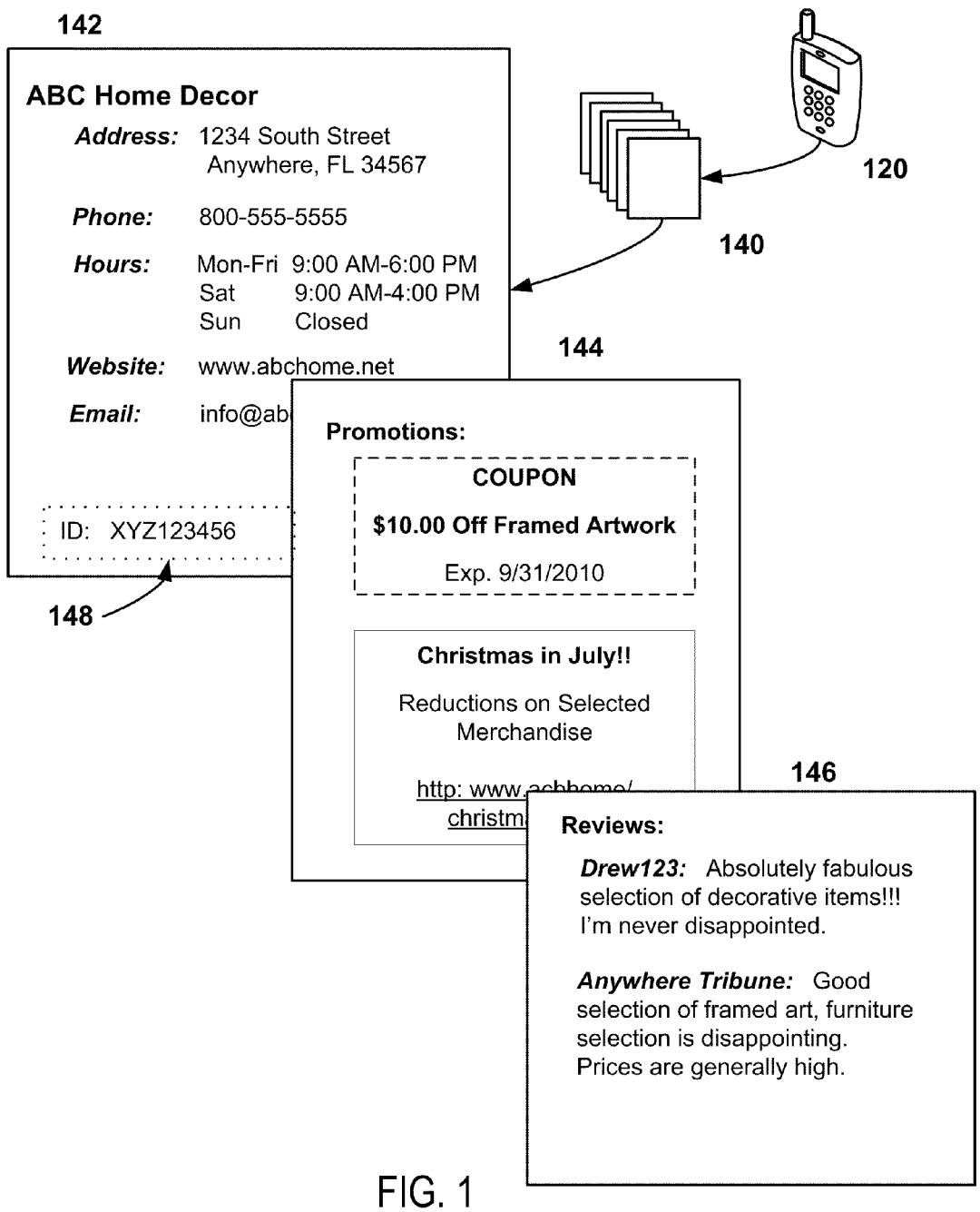
FIG. 1 shows one embodiment of an online address book stored on a user's mobile device that includes a variety of information on various businesses.

FIG. 1 shows one embodiment of an address book 140 on a user's mobile device 120 that includes a variety of information on various businesses. Views 142, 144 and 146 illustrate an example entry that represents how the user's mobile device 120 could display address book information.

In one embodiment, the user selects an address book application on the user's mobile device 120 to display the address book 140. In one embodiment, the user then selects an entry for a business of interest, causing first view 142 to display on the user's mobile device 120. In one embodiment, the address book application allows the user to page between the three views 142, 144 and 146.

View 142 of the example entry displays basic information about a hypothetical business "ABC Home Decor." In one embodiment, such basic information includes the business's address, business hours, phone number, website and email address. Basic information in view 142 could additionally include any other type of information that serves to define or identify the business, such as business category or product line information. Basic information in view 142 could additionally include additional text, graphic or image contact information, such as fax numbers, and additional phone numbers. Basic information in view 142 could also include additional information relating to hours of operation, such as holiday schedules and so forth.

View 142 further displays a unique identifier 148 for the business. In one embodiment, the unique identifier 148 uniquely identifies the business on the address book 140 and on one or more information sources accessible to the address book application over a network, such as the Internet. In one embodiment, the unique identifier 148 could take any form, such as an arbitrary grouping of numbers and/or alphabetic characters. In one embodiment, the address book application uses the unique identifier 148 to update information in the address book 140 by requesting updates from one or more information sources, as described in detail below. In one embodiment, views 142, 144 and 146 do not display the unique identifier 148, and the user is unaware of the existence of the identifier.

In one embodiment, a service provider assigns the unique identifier 148 to the business, such as, for example, a data aggregator that collects information on a large number of businesses. In one embodiment, the business selects and registers the unique identifier 148 with a service provider, such as, for example, a data aggregator that collects information on a large number of businesses such as an online directory service.

View 144 of the example entry displays sales and promotions currently offered by the business, which could include coupons and advertisements including web links as illustrated. Promotions could additionally employ any other type of online or offline sales or promotion techniques now known or later developed. For example, such promotions could include announcements or invitations to special events, such as wine tastings or opening parties. Such promotions could include hyperlinks with special online coupon codes for online sales.

View 146 of the example entry displays reviews of the business from various sources. The reviews could originate from any source where users, journalists, or any other type of online user is able to enter comments about a business. The illustrated view 146 displays two reviews, the first from a message board, the second from a local newspaper. The example reviews displayed in view 146 simply include the review source and the text of the review. View 146 could also display any other type of information relating to the reviews. For example, view 146 could display the date and time of the review. If a review is derived from an online source where a longer review is available, view 146 could include a hyperlink to the original review. If there are a large number of reviews of the business, view 146 could extend to multiple pages. In one embodiment, view 146 provides access to all reviews relating to the business. In one embodiment, view 146 only displays reviews entered within a defined time period, for example, the last three months. In one embodiment, view 146 displays a fixed number of reviews, for example, the ten most recent reviews. In one embodiment, view 146 only displays an average user rating and provides a link to a full review or set of reviews.

The information shown in views 142, 144 and 146 and its presentation is purely illustrative. The information displayed in an address book entry could include any type of information that relates to businesses that is available from the business itself or from any third party source. Furthermore, while the online address book 140 is shown on a user's mobile device 120 in FIG. 1, it is understood that the address book 140 could be implemented on other types of network connectable electronic devices such as desktop computers, laptops and PDAs.

In one embodiment, the address book application on the user's mobile device 120 periodically updates the information displayed in views 142, 144 and 146 to keep the information current. In one embodiment, an online address book application implemented on the user's mobile device 120 periodically retrieves updates to information relating to businesses in the address book 140 from one or more data sources using the unique identifiers 148 associated with such businesses. In one embodiment, the online address book application retrieves current information relating to a particular business when a user accesses the address book entry for that business. In one embodiment, the online address book application retrieves current information relating to a particular business when a user takes a user interface action with respect to the business's address book entry, such as, for example, clicking on an "Update" button. In one embodiment, the online address book application retrieves current information relating to all businesses in the address book 140 after the lapse of a time interval (e.g. 24 hours), when the user powers on the device, or takes some other user interface action.

In one embodiment, a data aggregation service (such as an online directory) is aware of address books 140 that include entries for one or more businesses, and the online directory service or data aggregator pushes updates to entries for such businesses directly to user's mobile devices 120 without being polled. In one embodiment, where updates to directories are pushed to users' mobile devices 120, an address book application running on the user's mobile device 120 notifies the user of the update through, for example, a notification alert that may be a graphical flag or indicator as part of the address book itself or application utilizing information from the address book or via separate text or email messages informing the user of the update.

In one embodiment, the information displayed in views 142, 144 and 146 originates from a variety of sources, including online directory services, online publications, message boards and so forth. In one embodiment, an online address book application implemented on the user's mobile device 120 retrieves address book information directly from the originating source. In one embodiment, an online address book application retrieves address book information from a single data aggregator, wherein the data aggregator collects information relating to a large number of businesses from a variety of sources. In one embodiment, the address book application further enables users to add or edit user defined fields in address book 140.

In one embodiment, the businesses in address book 140 control at least a portion of the information in views 142, 144 and 146 either directly or indirectly. For example, a data aggregation service could allow businesses to edit and update basic information in view 142 relating to the business whenever the business's address, phone number, hours, website or email address changes. In one embodiment, a data aggregation service allows businesses or advertising services acting on behalf of such businesses to add, update and delete promotional information.

In one embodiment, the businesses in address book 140 do not control at least a portion of the information in views 142, 144 and 146. For example, reviews of businesses may originate from third parties such as online publications or message boards. Such reviews may be favorable or unfavorable, but are of little value to end users if they can be edited or otherwise controlled by the reviewed businesses. In such embodiments, a data aggregation service allows third parties to add reviews of businesses directly to a review database, or such reviews could be extracted by the data aggregation service from other online sources, such as online newspapers or discussion groups.

In one embodiment, a business can be associated with multiple unique identifiers 148, where each unique identifier identifies a specific class of customers or potential customers of the business. For example, a business could be associated with one identifier directed to business users (e.g. business to business) and another identifier directed to ordinary consumers. In another example, one identifier could be associated with consumers in general, and another associated with preferred or long standing customers. The use of multiple unique identifiers could allow businesses to direct different types of information to different classes of customers, for example, a business might offer special promotions to preferred customers only.

In one embodiment, an online address book application implemented on the user's mobile device 120 retrieves address book information using the unique identifier 148. The identifier 148 may only be known to a single data source, such as a data aggregation service. Alternatively, the identifier 148 could be known to multiple data sources from which the online address book 140 retrieves information. In one embodiment, a directory service or data aggregator pushes information that includes unique identifiers for the businesses to which the information relates to the online address book application implemented on the user's mobile device 120.

In one embodiment, an address book application or similar application enters entries for specific businesses to a user's address book 140, which is stored on a user's mobile device 120, using any technique suitable for entering, receiving or downloading electronic information. In one embodiment, the address book application enters entries to a user's address book 140 when a user browses an online directory service or data aggregation service and selects one or more businesses. In one embodiment, the address book application enters entries to a user's address book 140 when a user enters a search via a local search application and selects one or more businesses displayed by the search application. In one embodiment, the business itself or an entity acting on behalf of the business emails address book entries to users as an attachment. In such an embodiment, the user could, for example, then open the attachment and save the entry to the user's address book 140. In all of the above embodiments, the address book entry created for a specific business could include the unique identifier 148 for the business, as described in detail above, which is obtained from the data source.

In one embodiment, an online address book application implemented on a user's mobile device 120 uses existing entries in a user's address book 140 and/or entries that the user added manually to the address book 140 to search for matching businesses in a directory service or data aggregation service. In one embodiment, an address book application automatically adds the business to the address book entry, including the unique identifier 148, when it finds an exact match (e.g. an exact match on a name, phone number and/or address). In one embodiment, if an address book application finds a near match, it prompts the user confirm the match, for example, by a prompt such as "If this is the same business click here to stay up to date with the latest information on 'business X'". In one embodiment, the address book application on the user's mobile device 120 searches for matches to new address book entries as soon as a user enters a new address book entry. In one embodiment, an address book application on the user's mobile device 120 searches for matches to new address book entries periodically, for example, every 24 hours.

While the above examples are presented with respect to an address book application local to a user's mobile device 120, it is understood that the above concepts apply to any application that stores or accesses information relating to one or more businesses. Such applications could be local to the user's device, or could be hosted by one or more servers accessible to the user's device over a network such as the Internet. Such servers could be physical servers maintained by or on behalf of an application service provider, or, additionally or alternatively, virtual servers maintained, for example, as cloud based servers. Furthermore, while a dynamically updated address book may prove most valuable to businesses in general, the system could also support dynamically updated entries for private individuals, such as a user's friends, relatives and/or business associates.

Figure 2:
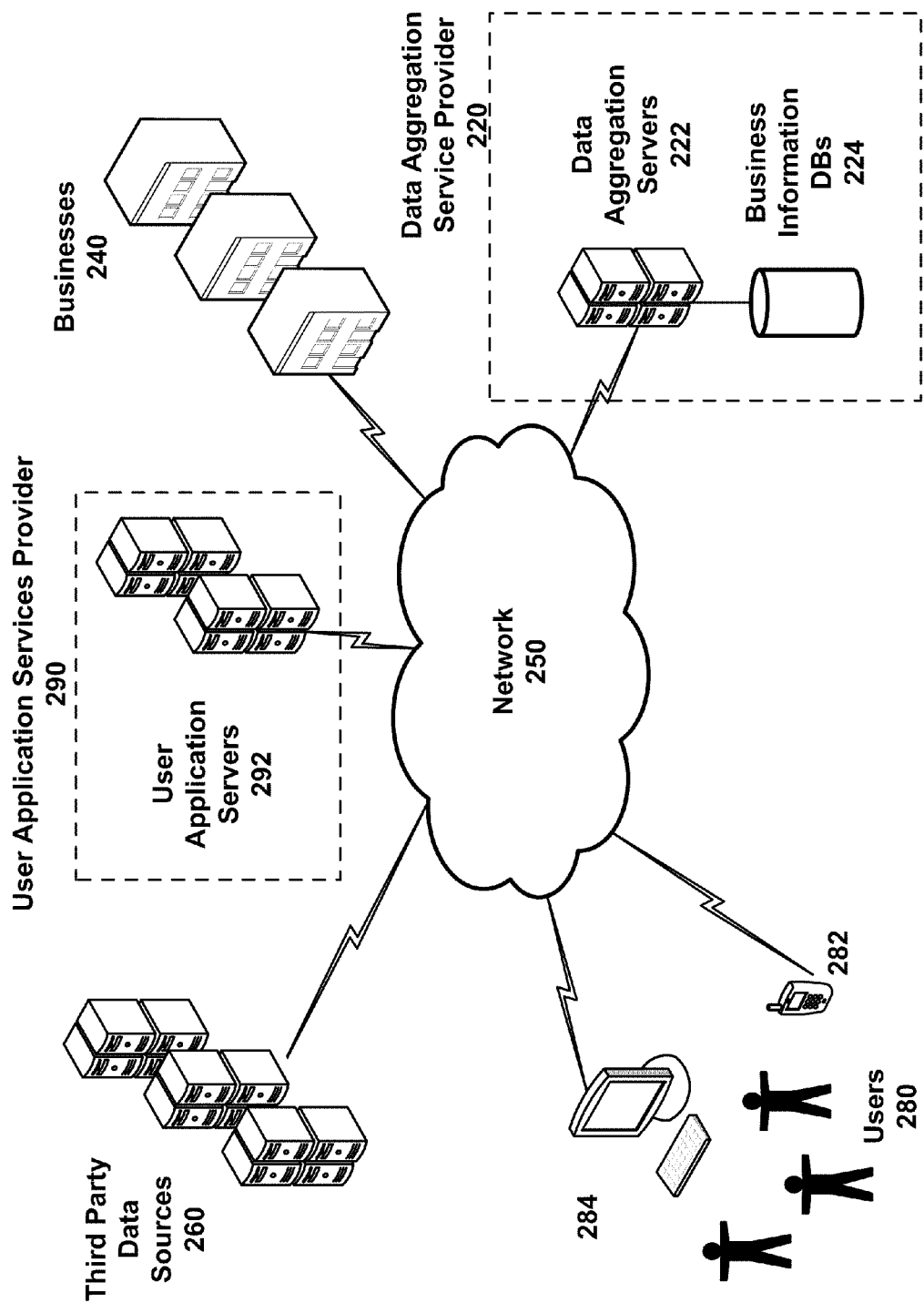
FIG. 2 shows a high-level view of components of one embodiment of a network that supports delivery of business information through an online address book.

FIG. 2 illustrates a high-level view of components of one embodiment of a network that supports delivery of business information through an online address book. A data aggregation service provider 220, which could be an online directory service or an online advertising service, maintains a database of information 224 relating to a number of businesses 240. In one embodiment, the information can include, as applicable, contact information, address information, hours of operation, promotion information and reviews as discussed in detail above with respect to FIG. 1.

In one embodiment, the data aggregation servers 222 collect information relating to the businesses 240 directly from the businesses over a network 250 such as the Internet and store the data in the business information databases 224. In one embodiment, the data aggregation servers 222 provide a user interface or API that allows businesses to transmit information relating to the business to the data aggregation servers. In one embodiment, the data aggregation servers 222 access corporate websites maintained by or on behalf of the businesses 240 and collect information without any direct interaction with the businesses 260. In one embodiment, the data aggregation servers 222 index all data relating to a specific business by a unique identifier as described above in detail above with respect to FIG. 1.

In one embodiment, one or more applications provide information relating to one or more of the businesses 240 to users 280. In one embodiment, user devices, such as mobile devices 282 or user computers such as laptops and desktops 284, implement such applications. Such applications could include, for example, a local address book application such as that shown in FIG. 1. In one embodiment, user application servers 292, such as those provided by application services providers 290, implement applications that provide information relating to one or more of the businesses 240, and users access them over the network 250. In one embodiment, user application servers 292 host a user address book or contact list application that is accessible over a network 250, such as the Internet, where the actual data can reside entirely in local storage operatively connected to application servers 292, or reside both in the application server and storage associated with other end points accessible over the network through a data synchronization process. Such storage could be storage associated with other service providers, for example, service providers offering cloud-based storage facilities.

In one embodiment, users 280 use address book applications implemented on user devices 282 and/or 284 or user application servers 292 to store and access information related to one or more businesses. In one embodiment, an address book database (not shown) stores the information locally on the user device 282 and/or 284. In one embodiment, the information is stored in a database that is remote from user devices 282 and/or 284, but accessible over the network 250, for example, local storage (not shown) associated with user application servers 292 or any other network accessible storage such as cloud-based storage (not shown). In one embodiment, every entry in a user's address book database includes a unique identifier for businesses in the address book database, and the address book application uses the unique identifier to request updated information from the data aggregation servers 222 relating to businesses identified by the unique identifier, via the network 250, as described in detail above.

Figure 3:
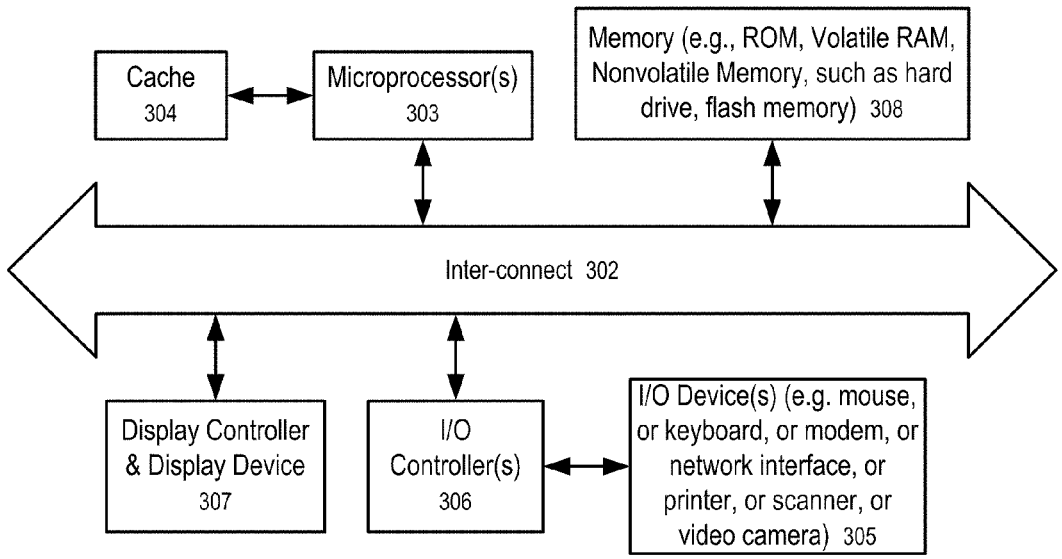
FIG. 3 shows a block diagram of a data processing system that can be used in various embodiments of the disclosed system and method.

FIG. 3 shows a block diagram of a data processing system that can be used in various embodiments of the disclosed system and method. While FIG. 3 illustrates various components of a computer system, it is not intended to represent any particular architecture or manner of interconnecting the components. Other systems that have fewer or more components may also be used.

In FIG. 3, the system 301 includes an inter-connect 302 (e.g., bus and system core logic), which interconnects a microprocessor(s) 303 and memory 308. The microprocessor 303 is coupled to cache memory 304 in the example of FIG. 3.

The inter-connect 302 interconnects the microprocessor(s) 303 and the memory 308 together and also interconnects them to a display controller and display device 307 and to peripheral devices such as input/output (I/O) devices 305 through an input/output controller(s) 306. Typical I/O devices include mice, keyboards, modems, network interfaces, printers, scanners, video cameras and other devices that are well known in the art.

The inter-connect 302 may include one or more buses connected to one another through various bridges, controllers and/or adapters. In one embodiment the I/O controller 306 includes a USB (Universal Serial Bus) adapter for controlling USB peripherals, and/or an IEEE-1394 bus adapter for controlling IEEE-1394 peripherals.

The memory 308 may include ROM (Read Only Memory), and volatile RAM (Random Access Memory) and non-volatile memory, such as hard drive, flash memory, etc.

Volatile RAM is typically implemented as dynamic RAM (DRAM), which requires power continually in order to refresh or maintain the data in the memory. Non-volatile memory is typically a magnetic hard drive, a magnetic optical drive, or an optical drive (e.g., a DVD RAM), or other type of memory system that maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In one embodiment, the data aggregation servers 222 and/or the user application servers 292 of FIG. 2, as well as corporate websites and third party data sources 260 are implemented using one or more data processing systems as illustrated in FIG. 3. In one embodiment, user devices such as user mobile devices 282 and user computers 284 that host or provide access to business information applications, such as an address book application, are implemented using one or more data processing system as illustrated in FIG. 3.

In some embodiments, one or more servers of the system illustrated in FIG. 3 are replaced with the service of a peer to peer network or a cloud configuration of a plurality of data processing systems, or a network of distributed computing systems. The peer to peer network, or cloud based server system, can be collectively viewed as a server data processing system.

Embodiments of the disclosure can be implemented via the microprocessor(s) 303 and/or the memory 308. For example, the functionalities described above can be partially implemented via hardware logic in the microprocessor(s) 303 and partially using the instructions stored in the memory 308. Some embodiments are implemented using the microprocessor(s) 303 without additional instructions stored in the memory 308. Some embodiments are implemented using the instructions stored in the memory 308 for execution by one or more general purpose microprocessor(s) 303. Thus, the disclosure is not limited to a specific configuration of hardware and/or software.

Figure 4:
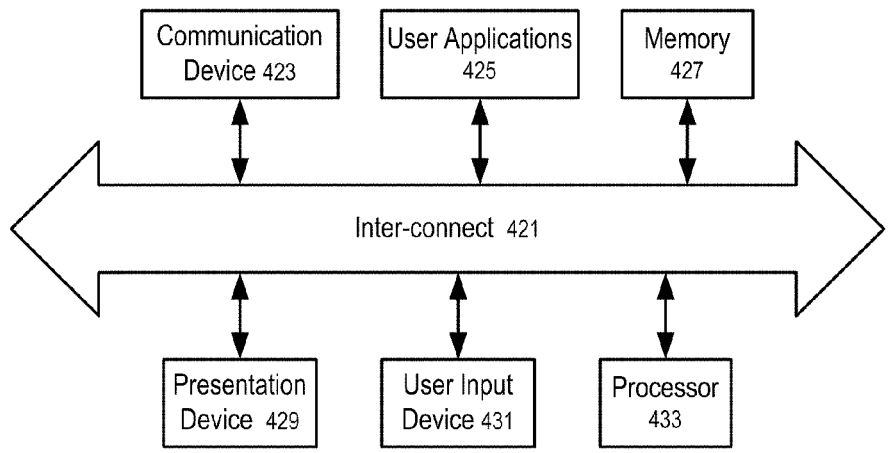
FIG. 4 shows a block diagram of a user device that can be used in various embodiments of the disclosed system and method.

FIG. 4 shows a block diagram of a user device, such as the devices 282 and 284 shown in FIG. 2 according to one embodiment. In FIG. 4, the user device includes an inter-connect 421 connecting a communication device 423, such as a network interface device, a presentation device 429, such as a display screen, a user input device 431, such as a keyboard or touch screen, user applications 425 implemented as hardware, software, firmware or a combination of any of such media, such as an address book application, a memory 427, such as RAM or magnetic storage, and a processor 433 that, inter alia, executes the user applications 425.

In one embodiment of FIG. 4, the user applications 425 include an address book application that acquires and stores information relating to businesses in an address book database stored in the memory 427. In one embodiment, every entry in the address book comprises information relating to a specific business, including a unique identifier for the each business.

In one embodiment, the address book application implements a user interface displayed on the presentation device 429 that provides functionality similar to, or identical to, the user interface illustrated in FIG. 1. In one embodiment, the address book application uses the communication device to communicate with data aggregation servers such as that shown in 222 of FIG. 2 to retrieve data relating to businesses stored in the address book database stored in local memory 427.

In one embodiment, users use the user input device 431 to enter contact information into the address book database via functionality provided by the address book application, such as that described in detail above with respect to FIG. 1. The user input device 431 may include a text input device, a still image camera, a video camera, and/or a sound recorder, etc.

Figure 5:
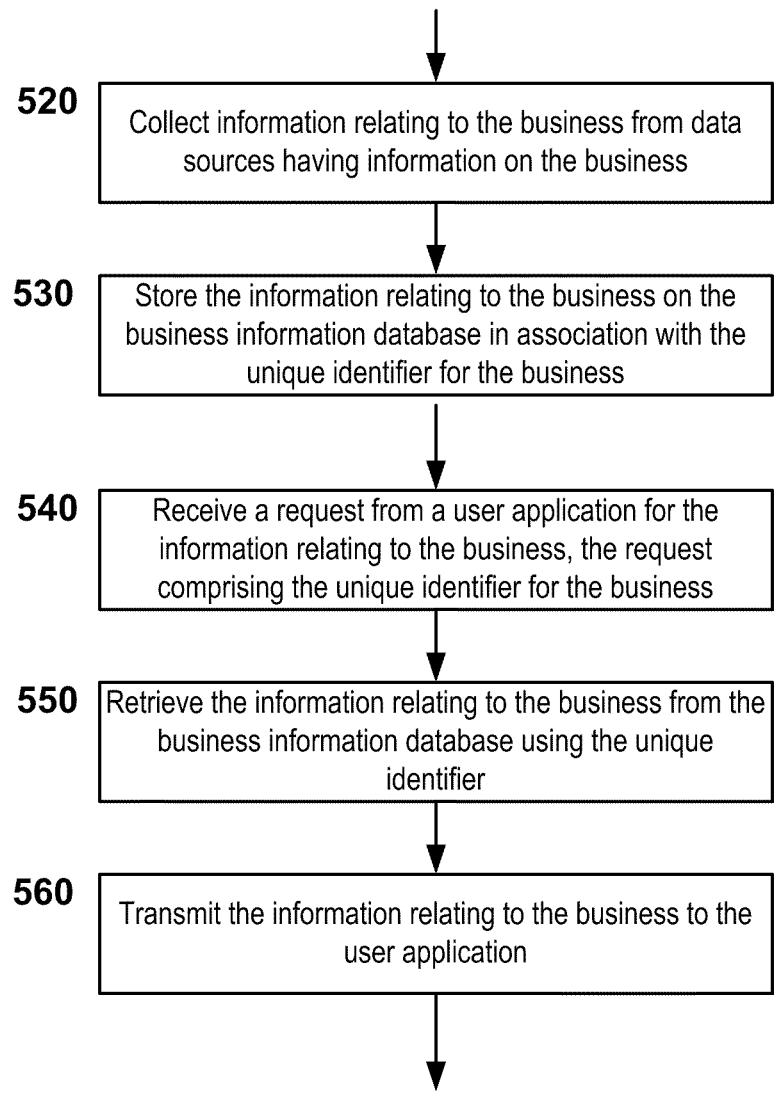
FIG. 5 shows a method that provides delivery of business information through an online address book.

FIG. 5 shows a method that provides delivery of business information through an online address book. In one embodiment, one or more servers such as the data aggregation servers shown in 222 of FIG. 2 perform the operations of the method shown in FIG. 5, and business information databases such as that shown in 224 of FIG. 2 store the data collected and stored by the method.

In the first operation of the method, one or more processes running on the server collect 520 information relating to the business from data sources having information on the business. In one embodiment, one or more processes on the server collect information directly from the business or entities acting on behalf of the business. In one embodiment, the processes running on the server automatically retrieve information from sources that are always, or usually online, such as the business's website. In one embodiment, the processes running on the server automatically retrieve information on a periodic basis, such as every 24 hours. In one embodiment, the business expressly transmits information to the server on a periodic basis. For example, the server provides a user interface, such as a web page or an API, that enables the business or an entity acting on behalf of the business, to transmit information relating to the business to the server. For example, in one embodiment, businesses provide basic contact and address information to the data aggregation service. Such information could additionally include address, phone number, hours, website or email address changes.

Businesses or entities acting on behalf of businesses, such as public relations firms and/or advertising firms, can transmit additional information to the server. Such information could be any information relevant to the business's customers or potential customers. In one embodiment, such information includes data relating to the business's promotions, including advertisements and coupons, which can include any combination of electronic data, such as text, graphics, media assets and/or hyperlinks. In one embodiment, businesses or entities acting on behalf of businesses periodically transmit updates to the information relating to the business to the server. In one embodiment, one or more processes running on the server access the business's corporate website or FTP sites and download information relating to the business in an automated fashion.

In one embodiment, one or more processes running on the server collect information relating to the business from one or more third party sources (e.g. third party sources 260 of FIG. 2). Such information could include any type of information relating to the business. In one embodiment, the processes running on the server automatically retrieve information from sources that are always, or usually online, such as online publications, message boards and discussion forums. In one embodiment, processes running on the server automatically retrieve information on a periodic basis, such as every 24 hours. In one embodiment, one or more processes running on the server provide a user interface and/or API that enables third parties to transmit information relating to the business to the server. In one embodiment, one or more processes running on the server access information delivery points provided by third parties, such as websites or APIs, to download information relating to the business from the third party in an automated fashion. In one embodiment, the business could provide a level of authorization to third party sources to provide information for one or more of the unique IDs for that business. Such information could indicate a level of certification for the information by the business itself and could then be rendered as an additional element to the customer viewing such information.

In the second operation of the method, one or more processes running on the server store 530 the information relating to the business on a business information database in association with the unique identifier for the business. In one embodiment, the unique identifier specifically identifies a particular business and is unique to that business. The unique identifier could comprise any combination of alphanumeric characters, special characters, symbols or other tokens that can be electronically represented. In one embodiment, a process running on a server creates and assigns the unique identifier to the business when information for the business is added to the database for the first time. In one embodiment, two or more unique identifiers are assigned to the same business.

Where more than one unique identifier relates to a single business, different information could be stored relating to each unique identifier, for example, each unique identifier could relate to different promotional information (e.g. regular vs. preferred customers). In one embodiment, one or more processes running on the server create and maintain the business information database on computer readable media accessible to the server. The computer readable media could be local to the server or accessible to the server over a network (e.g. a LAN, WAN or cloud based resource). The form of the information database could be any form suitable for storing and retrieving the information stored therein, such as, for example, a relational database.

In the third operation of the method, one or more processes running on the server receive 540 a request from a user application for the information relating to the business. In one embodiment, the request comprises the unique identifier for the business. In one embodiment, the user application requests the information when a business is added to a user's address book. The request could additionally specify other parameters to limit the information retrieved such as, for example, a defined time period or category of information. In one embodiment, the user application requests the information when a user displays an entry relating to the business in the user's address book. In one embodiment, the user application requests the information periodically, for example, every 24 hours.

In the fourth operation of the method, one or more processes running on the server retrieves 550 the information relating to the business from the business information database using the unique identifier. In one embodiment, all information relating to a business is, directly or indirectly, indexed by the business's unique identifier. In one embodiment, the processes running on the server only retrieve information updated within a defined time frame. The defined time frame could be specified in the request from the user application, or could be determined by determining the last time information relating to the business was retrieved by the server on behalf of the requesting user. In one embodiment, processes running on the server only retrieve information relating to a specific category of information such as, for example, promotions. The specific category of information could be specified in the request from the user application, or could represent a default value used by the processes running on the server that is always used unless specifically overridden by other request parameters.

In the fifth operation of the method, one or more processes running on the server transmit 560 the information relating to the business to the requesting application. The information can be transmitted using any method now known, or later to be developed in the art. In one embodiment, the processes running on the server format the transmitted information in a form configured for updating contact information for the business in an address book application on a user mobile device. In one embodiment, the processes running on the server format the transmitted information in a form configured for updating contact information for the business in an address book application on an application server.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data that, when executed by a data processing system, causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others.

In general, a machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations that are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
obtaining, at a computing device, information relating to a business, the information being received from a plurality of business data sources, wherein the plurality of business data sources comprises a data source controlled by the business, and wherein the information comprises a promotion provided by the data source controlled by the business and contact information for the business;
determining, by the computing device, a unique identifier representing the business;
storing, using the computing device, the information at a business information database with data identifying the unique identifier;
formatting, by the computing device, the information as an entry for an address book, the entry comprising the contact information, data specifying the unique identifier, and the promotion;
providing to a mobile device associated with a user, using the computing device, the entry for storage in an address book stored at the mobile device, wherein the unique identifier is not visible when displaying the entry at the mobile device;
determining, at the computing device, that updated information associated with the business is available, the determining being based, at least partially, upon communications with the plurality of business data sources;
retrieving, using the computing device, the updated information from the plurality of business data sources;
storing, using the computing device, the updated information at the business information database in association with the unique identifier;
receiving, at the computing device, a request for the updated information, the request specifying the unique identifier;
retrieving, at the computing device, the updated information associated with the unique identifier;
formatting, by the computing device, the updated information as an updated entry for the address book;
transmitting, by the computing device, the updated entry to the mobile device; and
determining, by the computing device, a plurality of unique identifiers representing the business,
wherein each unique identifier of the plurality of unique identifiers relates to a respective class of customers and is associated with a respective subset of the business information,
wherein the request comprises one unique identifier of the plurality of unique identifiers that relates to the respective class of customers assigned to the user by the business, and
wherein the respective subset of the business information that relates to the one unique identifier of the plurality of unique identifiers is retrieved and transmitted to the user.

2. The method of claim 1, wherein the updated entry for the address book and is provided to update the contact information for the business in the address book stored at the mobile device.

3. The method of claim 1, wherein the updated information comprises an updated promotion.

4. The method of claim 1, wherein the data source controlled by the business comprises a website for the business.

5. The method of claim 1, wherein at least a portion of the information is transmitted by the business to the computing device.

6. The method of claim 5, wherein the at least a portion of the information relating to the business is collected by the computing device via a user interface provided, over a network, to the business.

7. The method of claim 5, wherein the at least a portion of the information relating to the business is received via an application programming interface provided by the computing device.

8. The method of claim 1, wherein at least a portion of the information relating to the business is collected from a further data source not controlled by the business.

9. The method of claim 8, wherein the further data source not controlled by the business comprises an online publication and a message board.

10. The method of claim 8, wherein the at least a portion of the information comprises a review of the business.

11. The method of claim 1, wherein determining that the updated information is available further comprises identifying information relating to the business that was updated since a previous request for updated information.

12. The method of claim 1, wherein the request comprises a category of information, and wherein determining that the updated information is available comprises identifying only the information relating to the business that is in the category of information.

13. The method of claim 1, wherein the updated information comprises an updated unique identifier.

14. The method of claim 1, wherein the updated entry causes an address book application to retrieve the business information from a plurality of address book data sources using the unique identifier.

15. A non-transitory machine readable media having stored thereon computer-executable instructions that, when executed by a processor, cause the processor to perform operations comprising:
  obtaining information relating to a business, the information being received from a plurality of business data sources, wherein the plurality of business data sources comprises a data source controlled by the business, and wherein the information comprises a promotion provided by the data source controlled by the business and contact information for the business;
  determining a unique identifier representing the business;
  storing the information at a business information database with data identifying the unique identifier;
  formatting the information as an entry for an address book, the entry comprising the contact information, data specifying the unique identifier, and the promotion;
  providing, to a mobile device, the entry for storage in an address book stored at the mobile device, wherein the unique identifier is not visible when the mobile device displays the entry;
  determining that updated information associated with the business is available based, at least partially, upon communication with the plurality of data sources;
  retrieving the updated information from the plurality of data sources;
  storing the updated information at the business information database in association with the unique identifier;
  receiving a request for an update for the information, the request specifying the unique identifier;
  retrieving the updated information associated with the unique identifier;
  formatting the updated information as an updated entry for the address book;
  transmitting the updated entry to the mobile device; and
  determining a plurality of unique identifiers representing the business,
  wherein each unique identifier of the plurality of unique identifiers relates to a respective class of customers and is associated with a respective subset of the business information,
  wherein the request comprises one unique identifier of the plurality of unique identifiers that relates to the respective class of customers assigned to the user by the business, and
  wherein the respective subset of the business information that relates to the one unique identifier of the plurality of unique identifiers is retrieved and transmitted to the user.

16. A computer system comprising:
  a processor; and
  a memory that stores instructions that, when executed by the processor, cause the processor to perform operations comprising
    obtaining information relating to a business, the information being received from a plurality of business data sources, wherein the plurality of business data sources comprises a data source controlled by the business, and wherein the information comprises a promotion provided by the data source controlled by the business and contact information for the business,
    determining a unique identifier representing the business,
    storing the information at a business information database with data identifying the unique identifier,
    formatting the information as an entry for an address book, the entry comprising the contact information, data specifying the unique identifier, and the promotion,
    providing, to a mobile device, the entry for storage in an address book stored at the mobile device, wherein the unique identifier is not visible when the mobile device displays the entry,
    determining that updated information associated with the business is available based, at least partially, upon communication with the plurality of data sources,
    retrieving the updated information from the plurality of data sources,
    storing the updated information at the business information database in association with the unique identifier,
    receiving a request for an update for the information, the request specifying the unique identifier,
    retrieving the updated information associated with the unique identifier,
    formatting the updated information as an updated entry for the address book,
    transmitting the updated entry to the mobile device, and
    determining a plurality of unique identifiers representing the business,
    wherein each unique identifier of the plurality of unique identifiers relates to a respective class of customers and is associated with a respective subset of the business information,
    wherein the request comprises one unique identifier of the plurality of unique identifiers that relates to the respective class of customers assigned to the user by the business, and
    wherein the respective subset of the business information that relates to the one unique identifier of the plurality of unique identifiers is retrieved and transmitted to the user.

17. The method of claim 1, wherein the updated entry for the address book comprises a plurality of views, the plurality of views comprising
  a first view for displaying the updated contact information,
  a second view for displaying the updated promotion, and
  a third view for displaying a review associated with the business.

* * * * *